United States Patent
Hayashi (10) Patent No.: US 8,336,075 B2
(45) Date of Patent: Dec. 18, 2012

(54) INFORMATION DISTRIBUTION SYSTEM, PROGRAM-FOR-MANAGEMENT-APPARATUS RECORDING MEDIUM, AND PROGRAM-FOR-INFORMATION-PROCESSOR RECORDING MEDIUM

(75) Inventor: Koichi Hayashi, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 669 days.

(21) Appl. No.: 12/007,023

(22) Filed: Jan. 4, 2008

(65) Prior Publication Data
US 2008/0244674 A1     Oct. 2, 2008

(30) Foreign Application Priority Data
Mar. 30, 2007  (JP) .................................. 2007-092444

(51) Int. Cl.
*H04N 7/18* (2006.01)
(52) U.S. Cl. .............. 725/116; 725/16; 725/22; 725/91; 725/103; 725/109; 725/110; 725/114; 725/131; 725/138; 725/139
(58) Field of Classification Search .................... 725/16, 725/22, 91, 103, 109, 110, 114, 131, 138, 725/139, 144, 151; 370/230, 235, 236
See application file for complete search history.

(56) References Cited

U.S. PATENT DOCUMENTS

| | | | |
|---|---|---|---|
| 6,813,777 B1 * | 11/2004 | Weinberger et al. ............. 725/76 |
| 6,883,017 B1 | 4/2005 | Ujigawa et al. | |
| 7,142,512 B1 | 11/2006 | Kobayashi et al. | |
| 7,325,036 B2 * | 1/2008 | Simyon et al. ................. 709/206 |
| 2005/0177853 A1 * | 8/2005 | Williams et al. .................. 725/81 |
| 2006/0218620 A1 * | 9/2006 | Nadarajah et al. ............. 725/151 |
| 2006/0248553 A1 * | 11/2006 | Mikkelson et al. ............. 725/23 |
| 2006/0271989 A1 * | 11/2006 | Glaser et al. .................. 725/111 |
| 2007/0039033 A1 * | 2/2007 | Ota ............................... 725/115 |
| 2008/0134258 A1 * | 6/2008 | Goose et al. ..................... 725/91 |
| 2008/0141328 A1 * | 6/2008 | Weintraub et al. ............ 725/134 |
| 2008/0160906 A1 * | 7/2008 | Ranjan et al. ................ 455/3.01 |
| 2008/0291926 A1 * | 11/2008 | Hayashi ........................ 370/400 |
| 2009/0083809 A1 * | 3/2009 | Hayashi et al. ................. 725/88 |
| 2009/0122716 A1 * | 5/2009 | Hayashi ........................ 370/252 |
| 2009/0300673 A1 * | 12/2009 | Bachet et al. .................... 725/31 |

FOREIGN PATENT DOCUMENTS

| | | |
|---|---|---|
| JP | A-2001-209596 | 8/2001 |
| JP | A-2002-16599 | 1/2002 |
| JP | A-2004-102493 | 4/2004 |
| JP | A-2004-199578 | 7/2004 |
| JP | A 2006-197400 | 7/2006 |

* cited by examiner

*Primary Examiner* — Nasser Goodarzi
*Assistant Examiner* — Jivka Rabovianski
(74) *Attorney, Agent, or Firm* — Oliff & Berridge, PLC

(57) ABSTRACT

A content distribution system includes a node to which content is distributed via a network and a distribution management server for managing a content distribution status.

The node receives content, detects an information amount of received content, and, on the basis of the detected information amount, outputs a distribution completion notification indicative of a reception status of corresponding content.

On the other hand, the distribution management server receives the distribution completion notification for each node, and stores the received distribution completion information for each node.

11 Claims, 8 Drawing Sheets

INFORMATION DISTRIBUTION SYSTEM, PROGRAM-FOR-MANAGEMENT-APPARATUS RECORDING MEDIUM, AND PROGRAM-FOR-INFORMATION-PROCESSOR RECORDING MEDIUM

CROSS REFERENCE TO RELATED APPLICATIONS

The present application claims priority from Japanese Patent Application NO. 2007-092444, which was filed on Mar. 30, 2007, the disclosure of which is herein incorporated by reference in its entirety.

BACKGROUND OF THE INVENTION

1. Field of the Invention

The present invention belongs to the technical field of an information distribution system, a recording medium where a program for a management apparatus is recorded, and a recording medium where a program for an information processor is recorded. More particularly, the invention belongs to the technical field of an information distribution system for distributing moving picture information or the like corresponding to a movie or the like, a recording medium where a program for a management apparatus used in the management apparatus included in the distribution system is recorded, and a recording medium where a program for an information processor used in the information processor included in the distribution system is recorded.

2. Description of the Related Art

In recent years, the network technique of the Internet and the like has been progressed remarkably. For example, studies on a content distribution system as disclosed in Japanese Patent Application Laid-Open (JP-A) No. 2006-197400 have been conducted.

In the content distribution system, for example, content of a movie or the like is distributed first to any of a content node in the content distribution system via a network by the manufacturer or administrator (hereinbelow, the manufacturer or administrator will be simply called an administrator or the like), and accumulated/stored in the content node. First distribution of content to a content distribution system by the administrator or the like will be called "loading of content" below.

In the case of distributing the loaded content to the content distribution system, from the content node that accumulates/stores moving picture information or the like corresponding to the content, the moving picture information or the like is distributed (transmitted) to a request node operated by the user who desires to watch the content.

As for definition of the "content node", the paragraph [0071] in the specification of JP-A Patent Laid-open No. 2006-197400 can be referred to. As for definition of the "request node", the paragraphs [0064] and [0065] in the specification thereof can be referred to.

In the content distribution system, after initial loading, replicas of content once loaded are generated not only in the content node to which the content is loaded for the first time but also in other nodes in accordance with, for example, a distributed hash table (DHT) algorithm. As the replicas are gradually generated, not only the content node to which the content is loaded for the first time but also a plurality of content nodes that accumulate/store the same content exist in the content distribution system. Therefore, it realizes dispersion of distribution sources, and prompt and stable distribution to a request node is achieved.

A node in which the replica is generated will be properly called a "replica node". With respect to the DHT algorithm, the paragraphs [0039] to [0072] in the specification of JP-A Patent Laid-open No. 2006-197400 can be referred to.

On the other hand, some content which is loaded to the content distribution system and whose replicas are generated has to be managed by the administrator or the like who loaded the content, with respect to completion status (whether completed or not) of the progress (replica generation status) of distribution or distribution (generation of replicas) to a content node as the loading destination and a replica node in which the replica is generated.

Concretely, for example, when content of a kind whose fee of loading is paid is loaded and replicas are generated, the administrator or the like has to manage whether the content corresponding to the loading fee is distributed to the content node and the replica node or not.

In the case of loading content and generating replicas, when a failure in the distribution occurs for some reason on a distribution path for the loading or replica generation, the administrator has to take a measure to eliminate the failure promptly so as to recover the distribution, however, the administrator or the like has to manage the distribution status of each of content data while specifying a content node as the loading destination and a replica node in which a replica is generated, in order to detect occurrence of the frailer.

SUMMARY OF THE INVENTION

In the content distribution system of JP-A Patent Laid-open No. 2006-197400, index information (whose definition can be known by referring to, for example, the paragraph [0071] thereof) including location information (Internet Protocol (IP) address or the like) indicative of the location of each of the content nodes storing content and the replica nodes in the content distribution system is cached among a plurality of nodes. In this case, replicas of content are generated on the basis of the cache information in the nodes. As a result, a problem occurs such that the distribution status cannot be managed while specifying each of the content nodes and the replica nodes as the distribution destinations.

The present invention has been achieved in view of the above drawbacks. An object of the invention is to provide an information distribution system in which an administrator can reliably grasp/manage a status of distribution of content to each of content nodes and replica nodes, a recording medium where a program for a management apparatus included in the distribution system is recorded, and a recording medium where a program for an information processor included in the distribution system is recorded.

In order to solve the above problem, the invention according to claim 1 relates to an information distribution system including an information processor to which distribution information is distributed via a network, and a management apparatus for managing a distribution status of the distribution information, wherein the information processor comprises:

processor receiving means for receiving the distribution information;

detecting means for detecting an amount of the distribution information received; and output means for outputting reception status information indicative of a reception status of the corresponding distribution information on the basis of the detected information amount, and the management apparatus comprises:

management apparatus receiving means for receiving the reception status information for each of the information processor; and storing means for storing the reception status information received for each of the information processor.

DETAILED DESCRIPTION OF THE PREFERRED EMBODIMENTS

Best modes for carrying out the present invention will now be described with reference to the drawings. The following embodiments relate to the case where the present invention is applied to a content distribution system similar to that in the invention disclosed in JP-A No. 2006-197400, that is, a so-called P2P (Peer-to-Peer) content distribution system for distributing content such as a movie and music.

In the present invention, for a hardware configuration of the content distribution system and mechanisms for distributing content data corresponding to content after the content is loaded in the content distribution system, for example, the DHT, a routing table, and the like used for transmitting/receiving a message necessary for distributing the content, similar to those of the content distribution system disclosed in JP-A No. 2006-197400 are basically applied. That is, as a hardware configuration, a DHT, and a routing table in the content distribution system of the embodiment, specifically, those described in paragraphs [0039] to [0072] and shown in FIGS. 1 to 5 of JP-A No. 2006-197400 are used.

(I) First Embodiment

Figure 1A:
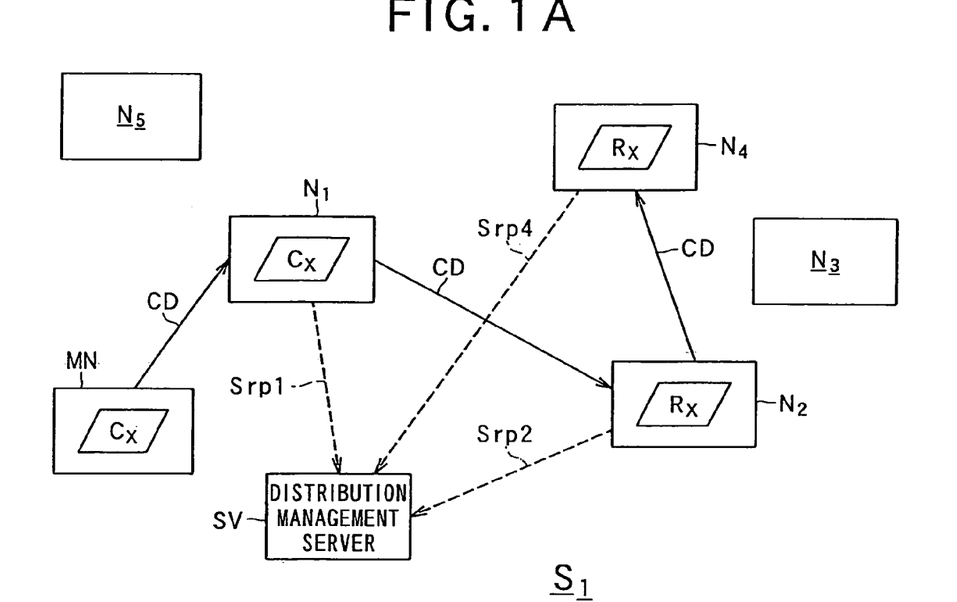
FIG. 1A is a block diagram showing a schematic configuration of a content distribution system of a first embodiment.
Figure 1B:
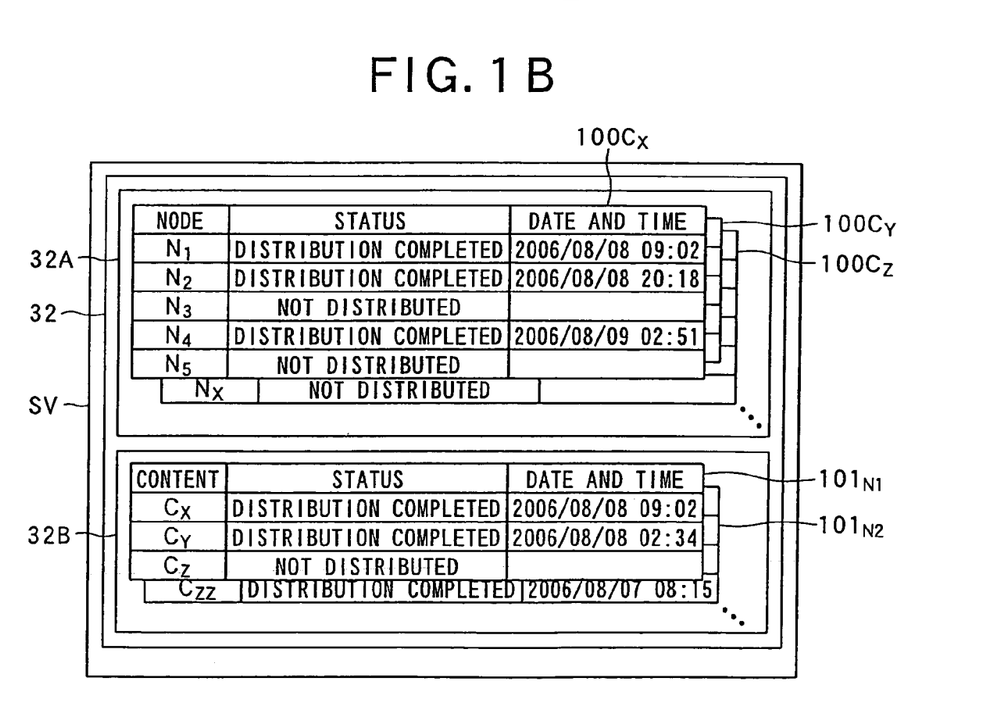
FIG. 1B is a diagram showing the details of information stored in a distribution management server of the content distribution system illustrated in FIG. 1A.

A first embodiment of the present invention will be described with reference to FIGS. 1A and 1B. FIGS. 1A and 1B are diagrams showing the configuration of a content distribution system of the first embodiment.

As shown in FIG. 1A, a content distribution system $S_1$ of the first embodiment is comprised of a content loading server MN, a distribution management server SV, and nodes $N_1$ to $N_5$. In this case, actual content distribution in the content distribution system $S_1$, specifically, content distribution carried out with the DHT or the like in response to a request from a request node is performed by the nodes $N_1$ to $N_5$.

In the configuration, the content loading server MN is managed and operated by an administrator or the like. The content loading server MN generates content data CD corresponding to a content Cx loaded in the content distribution system $S_1$ and transmits it to the node $N_1$ as content node as the destination of the content via a network.

Thereby, the node $N_1$ as the content node receives and stores the content data CD, and provides it for distribution to the request node in the content distribution system $S_1$. In addition, when the content Cx is stored in the node $N_1$ and distribution of the content Cx starts, as shown in FIG. 1A, according to a distribution algorithm using the DHT the content data CD is sequentially transferred to, for example, the nodes $N_2$ and $N_4$ for storing replicas Rx of the content Cx. By the transfer of the content data CD, the replicas Rx of the content Cx are stored in the $N_2$ and $N_4$ and used together with the content Cx for distribution.

With the loading of the content Cx and the generation of the replicas Rx, in the content distribution system $S_1$ of the first embodiment, after completion of loading of the content Cx to the node $N_1$ and generation of the replicas Rx in the nodes $N_2$ and $N_4$, the node $N_1$ to which the content Cx is loaded and the nodes $N_2$ and $N_4$ in which the replicas Rx have been generated distribution completion notifications Srp1, Srp2, and Srp4 each indicative of the completion, respectively, each indicative of the completion, and send them to the distribution management server SV via the network.

On the basis of the distribution completion notifications Srp1, Srp2, and Srp4, the distribution management server SV which has received the distribution completion notifications Srp1, Srp2, and Srp4 stores completion of the distribution of the content data CD to the nodes $N_1$, $N_2$, and $N_4$, in other words, completion of loading of the content Cx to the node $N_1$ and generation of the replicas Rx in the nodes $N_2$ and $N_4$.

Specifically, in a first storage area 32A in a storage 32 which will be described later in the distribution management server SV, distribution status information 100s indicative of distribution completion statuses of each of content Cs to each of the nodes Ns are generated with respect to each of the nodes Ns and are stored. More concretely, as shown in FIG. 1B, for example, distribution status information $100C_X$ indicative of distribution completion statuses of the content $C_X$ to each of the nodes $N_1$ to $N_5$ is generated with respect to each of the nodes $N_1$ to $N_5$ on the basis of the received distribution completion notifications Srp1, Srp2, and Srp4, and stored in the first storage area 32A. At this time, in the case shown in FIG. 1A, distribution of the content $C_X$ to the nodes $N_1$, $N_2$, and $N_4$ is completed. Consequently, in the distribution status information $100C_X$ of the content $C_X$, the statuses of distribution (distribution statuses) corresponding to the nodes $N_1$, $N_2$, and $N_4$ are "distribution completed", and the date and time of distribution completion are also stored. The distribution status information 100 is stored by each of the content Cs, thereby, in the case shown in FIG. 1B, similar distribution status information $100C_Y$ and $100C_Z$ on content $C_Y$ and $C_Z$ are stored together with the distribution status information $100C_X$.

In addition, in a second storage area 32B in the storage 32, separately from the distribution status information 100s by each of the content Cs, distribution status information 101s indicative of distribution completion statuses of each of the content Cs in each of the nodes Ns, which are expressed with respect to each of the content Cs are stored. More concretely, as shown in FIG. 1B, for example, distribution status information $101_{N1}$ indicative of distribution completion statuses of each of the content $C_X$ to $C_Z$ at the node $N_1$ is generated and stored in the second storage area 32B with respect to each of the content $C_X$ to $C_Z$. At this time, in the case shown in FIG. 1B, distribution of the content $C_X$ to the nodes $N_1$, $N_2$, and $N_4$ is complete. Consequently, in the distribution status information $101_{N1}$ of the node $N_1$, the status of distribution (distribution status) corresponding to the content $C_X$ is "distribution completed", and the date and time of distribution completion are also stored. The distribution status information 101s are stored by each of the nodes Ns, and in the case shown in FIG. 1B, similar distribution status information $101_{N2}$ of the node $N_2$ is stored together with the distribution status information $101_{N1}$.

By storing the distribution status information 100s or 101s on the basis of the distribution completion notifications Srp1, Srp2, and Srp4 sent from the nodes Ns as the distribution destination, completion of distribution to each of the nodes Ns can be managed in a real time manner in the distribution management server SV.

(II) Second Embodiment

Figure 2A:
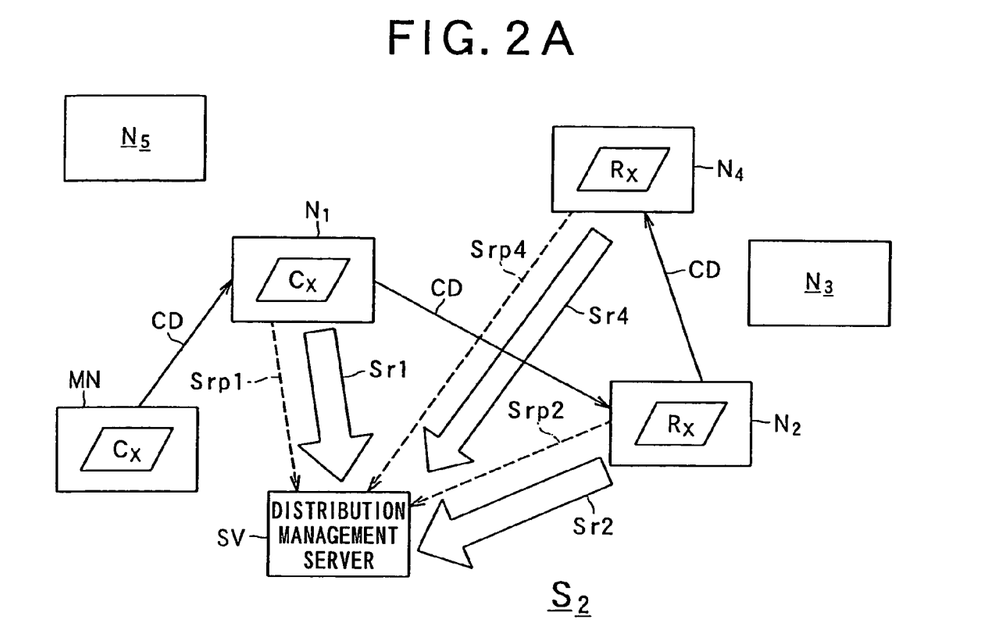
FIG. 2A is a block diagram showing a schematic configuration of a content distribution system of a second embodiment.
Figure 2B:
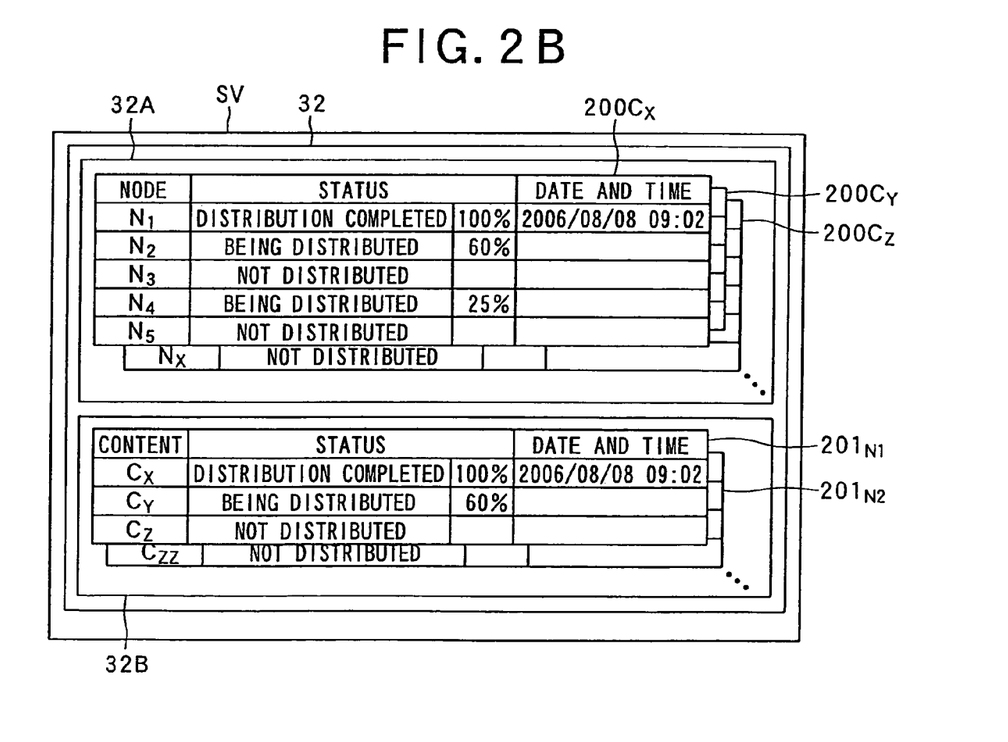
FIG. 2B is a diagram showing the details of information stored in a distribution management server of the content distribution system illustrated in FIG. 2A.

A second embodiment of the present invention will be described with reference to FIGS. 2A and 2B. FIGS. 2A and 2B are diagrams showing the configuration of a content distribution system of the second embodiment. In FIGS. 2A and 2B, the same reference numerals are designated to components similar to those of the content distribution system $S_1$ of the first embodiment shown in FIGS. 1A and 1B, and detailed description thereof will not be repeated.

In the first embodiment described above, on completion of distribution of the content data CD corresponding to the content C to the node N as the distribution destination of the content C, the distribution completion notification Srp is transmitted to the distribution management server SV. In the content distribution system of the second embodiment described below, in addition to the distribution completion notification Srp indicative of completion of distribution, distribution progress notification Sr indicative of the progress during the distribution is transmitted to the distribution management server SV.

That is, in a content distribution system $S_2$ of the second embodiment shown in FIG. 2A, with the loading of the content $C_X$ and the generation of the replicas $R_X$ like in the content distribution system $S_1$ of the first embodiment, the node $N_1$ and the nodes $N_2$ and $N_4$ generate distribution progress notifications Sr1, Sr2, and Sr4, respectively, each indicative of the progress of loading and generation in the loading process and the generating process, and send them to the distribution management server SV via the network in preset intervals or every preset time (for example, every hour). When the loading of the content $C_X$ to the node $N_1$ and generation of the replicas $R_X$ in the nodes $N_2$ and $N_4$ are completed, in a manner similar to the first embodiment, the node $N_1$ and the nodes $N_2$ and $N_4$ generate the distribution completion notifications Srp1, Srp2, and Srp4 each indicative of the completion, respectively and send them to the distribution management server SV via the network.

On the basis of the distribution progress notifications Sr1, Sr2, and Sr4 and the distribution completion notifications Srp1, Srp2, and Srp4, the distribution management server SV which has received the distribution progress notifications Sr1, Sr2, and Sr4 and the distribution completion notifications Srp1, Srp2, and Srp4 stores the progress or completion of the distribution of the content data CD to the nodes $N_1$, $N_2$, and $N_4$.

More concretely, in the first storage area 32A of the distribution management server SV included in the content distribution system $S_2$ of the second embodiment, distribution status information 200s indicative of distribution progress statuses or distribution completion statuses of each of content Cs to each of the nodes Ns are generated with respect to each node and are stored. Specifically, as shown in FIG. 2B, for example, distribution status information $200C_X$ indicative of distribution progress statuses or distribution completion statuses of the content $C_X$ to the nodes $N_1$ to $N_5$ with respect to each of the nodes $N_1$ to $N_5$ is generated on the basis of the received distribution progress notifications Sr1, Sr2, and Sr4 and distribution completion notifications Srp1, Srp2, and Srp4, and stored in the first storage area 32A. At this time, in the case shown in FIG. 2A, distribution of the content $C_X$ to the node $N_1$ is completed. Consequently, in the distribution status information $200C_X$ of the content $C_X$, the status of distribution to the node $N_1$ is "distribution completed", and the date and time of distribution completion are also stored. On the other hand, distribution of the content $C_X$ to the nodes $N_2$ and $N_4$ has not been completed, therefore, in the distribution status information $200C_X$, the statuses of distribution to the nodes $N_2$ and $N_4$ are stored as the progress in units of "%" indicated by the distribution progress notifications Sr2 and Sr4. After the distribution to the nodes $N_2$ and $N_4$ progresses and is completed, like the case of the node $N_1$, the corresponding distribution status is "distribution completed" and, further, the date and time of distribution completion are stored. The distribution status information 200s are stored for each of the content Cs, thereby, in the case of FIG. 2B, similar distribution status information $200C_Y$ and $200C_Z$ of the content $C_Y$ and $C_Z$ are stored together with the distribution status information $200C_X$.

In addition, in the second storage area 32B of the distribution management server SV included in the content distribution system $S_2$ of the second embodiment, separately from the distribution status information 200s by the content Cs, distribution status information 201s indicative of distribution progress statuses or distribution completion statuses of each of the content Cs in each of the nodes Ns, which are expressed with respect to each of the content Cs are stored. More concretely, as shown in FIG. 2B, for example, distribution status information $201_{N1}$ indicative of distribution progress statuses or distribution completion statuses of each of the content $C_X$ to $C_Z$ at the node $N_1$ is generated and stored in the second storage area 32B with respect to the content $C_X$ to $C_Z$. At this time, in the case shown in FIG. 2B, as described above, only distribution of the content $C_X$ to the node $N_1$ is completed. Consequently, in the distribution status information $201_{N1}$ of the node $N_1$, the status of distribution corresponding to the content $C_X$ is "distribution completed", and the date and time of distribution completion are also stored. The distribution status information 201s are stored by each of the nodes Ns and in the case shown in FIG. 2B, similar distribution status information $201_{N2}$ of the node $N_2$ is stored together with the distribution status information $201_{N1}$.

By storing the distribution status information 200 or 201 on the basis of the distribution progress notifications Sr1, Sr2, and Sr4 and the distribution completion notifications Srp1, Srp2, and Srp4 sent from the nodes Ns as the distribution destination, the distribution statuses to each of the nodes Ns including the progress statuses can be managed in a real time manner in the distribution management server SV.

(III) Third Embodiment

Figure 3:
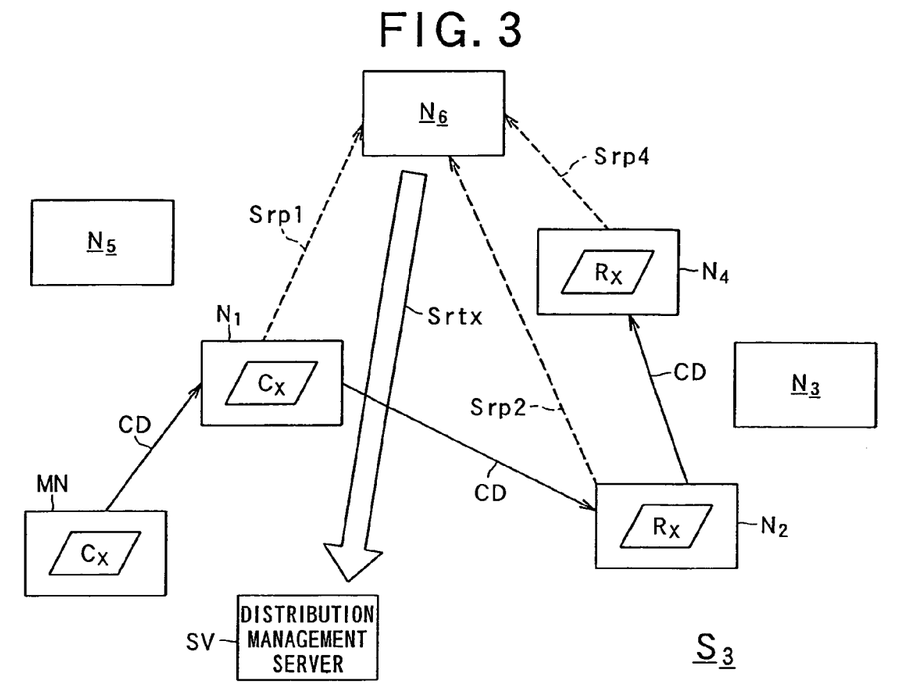
FIG. 3 is a block diagram showing a schematic configuration of a content distribution system of a third embodiment.

A third embodiment of the present invention will be described with reference to FIG. 3. FIG. 3 is a diagram showing the configuration of a content distribution system of the third embodiment. In FIG. 3, the same reference numerals are designated to components similar to those of the content distribution system $S_1$ of the first embodiment shown in FIGS. 1A and 1B, and detailed description thereof will not be repeated.

In the first or second embodiment, in progress or on completion of distribution of the content data CD corresponding to the content C to the node N as the distribution destination of the content C, the distribution progress notification Sr and the distribution completion notification Srp are transmitted from each of the nodes Ns to the distribution management server SV. In the content distribution system of the third embodiment described below, according to the DHT algorithm, the distribution progress notification or the distribution completion notification on each of the nodes Ns to which the content C is to be distributed from a root node of the content C managing distribution of each of the content Cs is transmitted to the distribution management server SV. With respect to definition of the "root node", for example, paragraph [0053] in the specification of JP-A No. 2006-197400 can be referred to.

More concretely, description will be given with reference to the case of the first embodiment. As shown in FIG. 3, in a content distribution system $S_3$ of the third embodiment, after completion of loading of the content $C_X$ to the node $N_1$ and generation of the replicas $R_X$ in the nodes $N_2$ and $N_4$, the node $N_1$ to which the content $C_X$ is loaded and the nodes $N_2$ and $N_4$ in which the replicas $R_X$ have been generated generate the distribution completion notifications Srp1, Srp2, and Srp4, respectively, each indicative of the completion, and send them to a node $N_6$ as the root node. On completion of all of the loading of the content $C_X$ and generation of the replicas $R_X$, the node $N_6$ transmits the distribution completion notification Srtx indicative of the completion (including the information of distribution completion date and time) to the distribution management server SV.

On the basis of the transmitted distribution completion notification Srtx, the distribution management server SV stores, for example, the distribution status information $100s$ and $101s$ as shown in FIG. 1B into the storage 32.

The content distribution system $S_3$ of the third embodiment will be described on the basis of the case of the second embodiment. During progress or on completion of the loading of the content $C_X$ and generation of the replicas $R_X$, the node $N_1$ and the nodes $N_2$ and $N_4$ generate the distribution progress notifications Sr1, Sr2, and Sr4 and the distribution completion notifications Srp1, Srp2, and Srp4 and send them to the node $N_6$. During progress or on completion of the loading of the content $C_X$ and generation of the replicas $R_X$, the node $N_6$ transmits a distribution completion notification Srtx indicative of the progress or the completion (including information of distribution completion date and time) to the distribution management server SV.

On the basis of the distribution completion notification Srtx transmitted, the distribution management server SV stores, for example, the distribution status information 200 and 201 shown in FIG. 2B into the storage 32.

(IV) Fourth Embodiment

Figure 4:
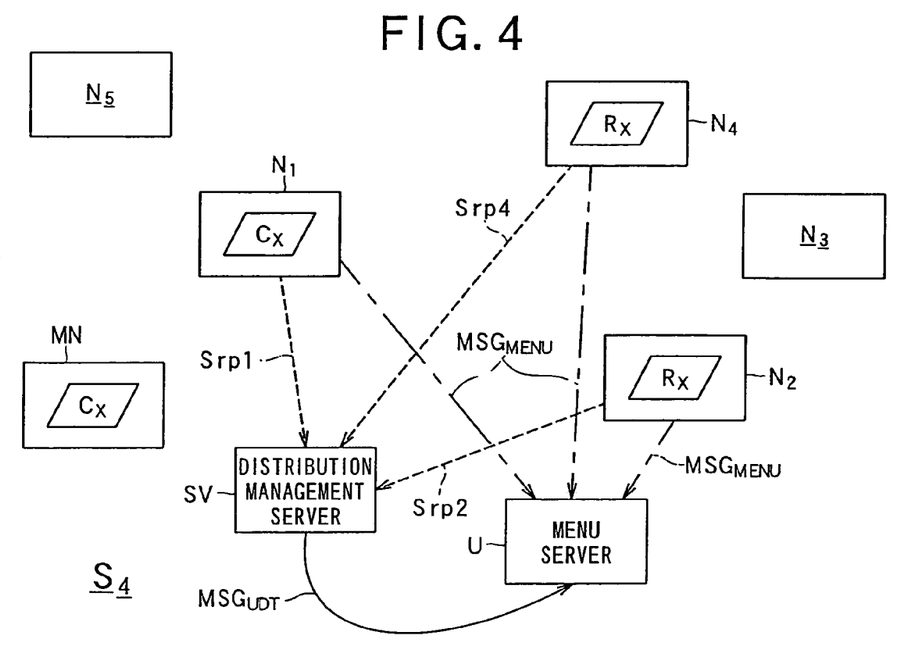
FIG. 4 is a block diagram showing a schematic configuration of a content distribution system of a fourth embodiment.

Finally, a fourth embodiment of the present invention will be described with reference to FIG. 4. FIG. 4 is a diagram showing the configuration of a content distribution system of the fourth embodiment. In FIG. 4, the same reference numerals are designated to components similar to those of the content distribution system $S_1$ of the first embodiment shown in FIGS. 1A and 1B, and their detailed description will not be repeated.

In the first to third embodiments, the progress or completion state of loading of the content C and generation of the replicas Rs are stored in the distribution management server SV and managed by the server SV. The content distribution system of the fourth embodiment described below includes, as shown in FIG. 4, a menu server U for displaying a list of content C (content menu) which can be viewed in each of the nodes Ns so as to be viewed from each of the nodes N via a network. A concrete menu displayed by the menu server U is updated with the distribution status information $100s$ and $101s$, or $200s$ and $201s$ stored in the distribution management server SV.

More concretely, description will be given with reference to the case of the first embodiment. As shown in FIG. 4, in a content distribution system $S_4$ of the fourth embodiment, on the basis of the distribution completion notifications Srp1, Srp2, and Srp4 from the node $N_1$ to which the content CX is loaded and the nodes $N_2$ and $N_4$ in which the replicas $R_X$ are generated, the distribution status information $100s$ and $101s$ (in the case of the first embodiment) or $200s$ and $201s$ (in the case of the second embodiment) are stored in the distribution management server SV. On the basis of the distribution status information $100s$ and $101s$ or $200s$ and $201s$, the distribution management server SV, then generates a menu update message $MSG_{UDT}$ indicative of the content $C_X$ which can be obtained/reproduced in each of the nodes Ns completing transmission, in other words, participating in the content distribution system $S_4$ and transmits it to the menu server U via a network.

On the basis of the received menu update message $MSG_{UDT}$, the menu server U which has received the menu update message $MSG_{UDT}$ updates a content menu indicative of the content Cs which can be obtained/reproduced at each of the nodes Ns at the time point in the menu server U. Therefore, each of the nodes Ns (including the nodes $N_1$, $N_2$, and $N_4$) participating in the content distribution system $S_4$ can display the latest content menu updated on the basis of the menu update message $MSG_{UDT}$ by a process such as transmission of a menu request message $MSG_{MENU}$ to the menu server U.

By using each of the distribution status information $100s$ and $101s$ and $200s$ and $201s$ updated in the distribution management server SV, the content menu indicative of the content Cs which can be obtained/reproduced in each of the nodes N can be always maintained in the latest state.

First Example

The concrete configurations and processes of the content loading server MN, each of the nodes Ns, and the distribution management server SV belonging to the content distribution system $S_1$ of the first embodiment will be described as a first example with reference to FIGS. 5A and 5B, 6A and 7.

Figure 5A:
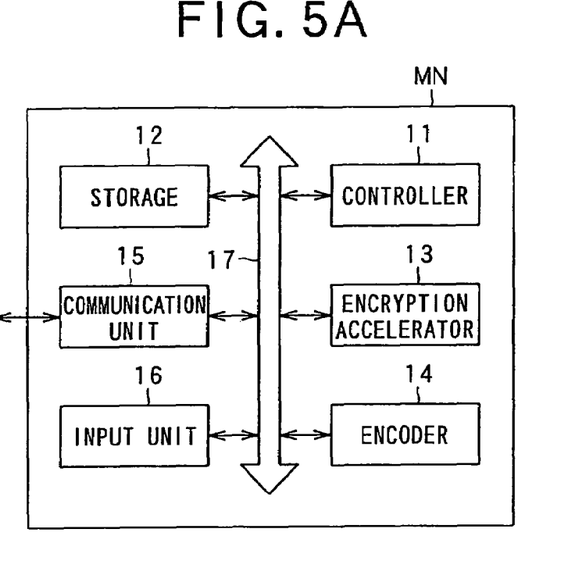
FIG. 5A is a block diagram showing a detailed configuration of a content loading server in each of the embodiments.
Figure 5B:
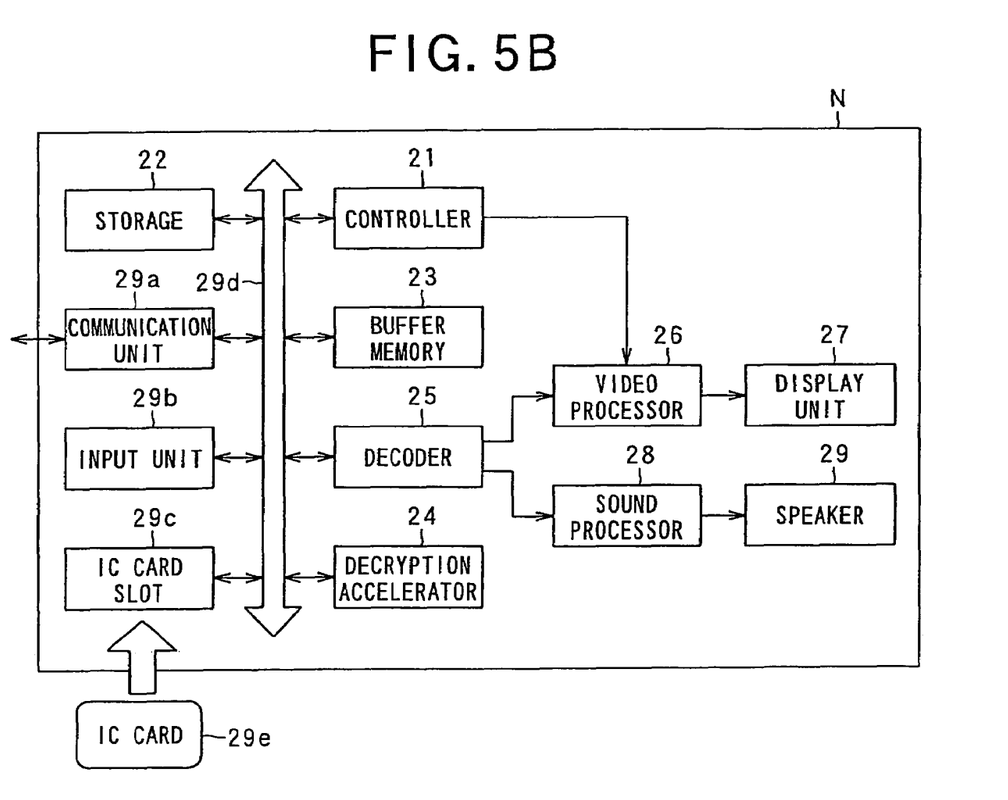
FIG. 5B is a block diagram showing a detailed configuration of a node in each of the embodiments.
Figure 6A:
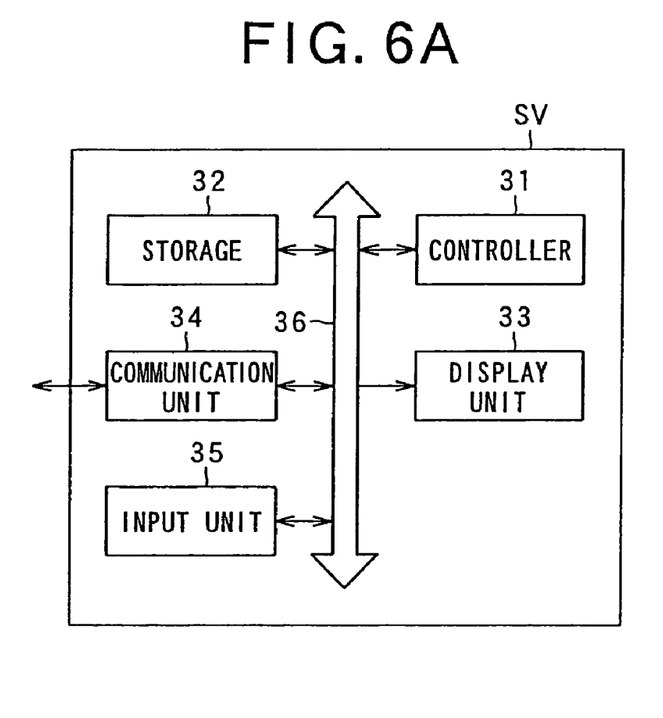
FIG. 6A is a block diagram showing a detailed configuration of a distribution management server in each of the embodiments.
Figure 7:
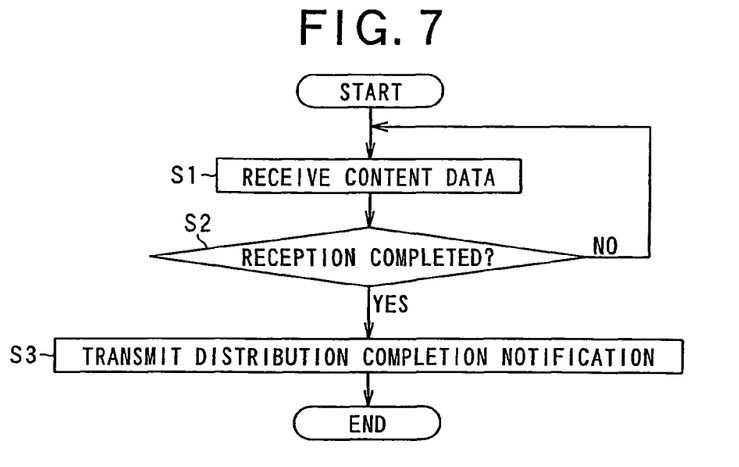
FIG. 7 is a flowchart showing processes performed in each of nodes in a first example.

FIG. 5A is a block diagram showing a detailed configuration of the content loading server MN of the first example, FIG. 5B is a block diagram showing the detailed configuration of the representative node N in the first example, FIG. 6A is a block diagram showing the detailed configuration of the distribution management server SV in the first example, and FIG. 7 is a flowchart showing processes in the first example executed by the representative node N.

First, the schematic configuration and schematic operation of the content loading server MN of the first example will be described with reference to FIG. 5A.

As shown in FIG. 5A, the content loading server MN of the first example has: a controller 11 as delay device detecting means and cause detecting means comprised of a CPU having a computing function, a work RAM, a ROM for storing various data and programs (including an operating system (OS) and various applications), and the like; a storage 12 as storing means such as an HDD for storing content data (packet) corresponding to generated content Cs; an encryption accelerator 13 for encrypting content data with an encryption key to load the data; an encoder 14 for converting content data to a specified data format; a communication unit 15 as management apparatus receiving means and distribution promoting means for performing communication control on information to/from each of nodes Ns via a communication line or the like; and an input unit (such as a keyboard, a mouse, and the like) 16 for receiving an instruction from the user (the administrator or the like) and supplying an instruction signal according to the instruction received to the controller 11. The above components are connected to each other via a bus 17.

In the configuration, the controller 11 controls the whole content loading server MN by executing the program stored in the storage 12 or the like by the CPU. The controller 11 converts the data format of the content data stored in the storage 12 by using the encoder 14, then, makes the encryption accelerator 13 encrypt the content data with the encryption key, divides the content data to predetermined data amounts, thereby generating a plurality of continuous packets, and distributes the packets to the node $N_1$ via the communication unit 15.

The controller 11 determines a node N (the node $N_1$ in the case of the first embodiment) as the loading destination of the content data with reference to a participation connection mode (topology) table as the content distribution system $S_1$ stored in the storage 12. In the connection mode table, at least, the IP addresses, port numbers, and the like of the nodes Ns which can be connected to the content loading server MN, in other words, the nodes Ns as loading destination of content data are written.

Next, the schematic configuration and schematic operation of each of the nodes N of the first example will be described with reference to FIG. 5B. Each of the nodes Ns of the first example has basically the same configuration.

As shown in FIG. 5B, the node N of the first example has: a controller 21 as detecting means comprised of a CPU having a computing function, a work RAM, a ROM for storing various data and programs (including an OS and various applications), and the like; a storage 22 as reception status information storing means such as an HDD for storing various data, programs, and the like; a buffer memory 23 for temporarily accumulating (storing) received content data; a decryption accelerator 24 for decrypting encrypted content data stored in the buffer memory 23 with a decryption key; a decoder 25 for decoding (decompressing or the like) video data, audio data, and the like included in the decrypted content data and reproducing it; a video processor 26 for performing a predetermined drawing process on the reproduced video data and the like and outputting the resultant data as a video signal; a display unit 27 such as a CRT or a liquid crystal display for displaying a video image on the basis of the video signal output from the video processor 26; a sound processor 28 for digital-to-analog (D/A) converting the reproduced audio data to an analog sound signal, amplifying the analog sound signal by an amplifier, and outputting the amplified signal; a speaker 29 for outputting the sound signal output from the sound processor 28 as sound waves; a communication unit 29a as processor receiving means, output means, and reception status information transmitting means for performing communication control with the content loading server MN, another node N, the distribution management server SV, or the like via a communication line or the like; an input unit (such as a mouse, a keyboard, an operation panel, a remote controller, and the like) 29b for outputting instruction signals corresponding to various instructions from the user (viewer) to the controller 21; and an IC card slot 29c for reading/writing information from/to an IC card 29e. The controller 21, storage 22, buffer memory 23, decryption accelerator 24, decoder 25, communication unit 29a, input unit 29b, and IC card slot 29c are connected to each other via a bus 29d.

The IC card 29e has tampering resistance (that is, a tampering measure is taken so that secret data can be prevented from being read and easily analyzed by unauthorized means). For example, the IC card 29e is distributed to the user of each of the nodes Ns from the administrator of the content distribution system $S_1$. The IC card 29e is comprised of an IC card controller made by a CPU, a nonvolatile memory (such as an EEPROM) having tampering resistance, and the like. In the nonvolatile memory, the user ID, a decryption key for decrypting encoded content data, a digital certificate, and the like are stored.

On the other hand, the buffer memory 23 is, for example, a First In First Out (FIFO) type ring buffer memory. Under control of the controller 21, content data CD received via the communication unit 29a is temporarily stored into a storage area indicated by a reception pointer.

The controller 21 controls the node N generally by making the CPU included in the controller 21 read and execute a program stored in the storage 22 or the like, receives a plurality of packets distributed via a network by the communication unit 29a, writes the packets into the buffer memory 23, and reads packets (packets received in the past for predetermined time) stored in the buffer memory 23, then transmits (relays) the packets to another node N via the communication unit 29a. In addition, the buffer memory 23 reads the packets stored in the storage area in the buffer memory 23 indicated by a reproduction pointer and outputs the read packets to the decryption accelerator 24 and the decoder 25 via the bus 29d.

For example, the program described above may be downloaded from a predetermined server on the network or recorded on a recording medium such as a CD-ROM and read via a drive of the recording medium.

Finally, schematic configuration and schematic operation of the distribution management server SV of the first example will be described with reference to FIG. 6A.

As shown in FIG. 6A, the distribution management server SV of the first example has: a controller 31 comprised of a CPU having computing function, a work RAM, a ROM for storing various data and programs (including an OS and various applications), and the like; a storage 32 made by an HDD or the like for storing various data and the like; a communication unit 34 for controlling communication of information with each of the nodes Ns and the like via the network; a display unit 33 such as a CRT or a liquid crystal display for performing necessary displaying as the distribution management server SV under control of the controller 31; and an input unit (such as a mouse, a keyboard, an operation panel, a remote controller, and the like) 35 for outputting instruction signals corresponding to various instructions from the user (distribution administrator) to the controller 31. The components are connected to each other via a bus 36.

In the configuration, the first storage area 32A and the second storage area 32B shown in FIG. 1B are formed in the storage 32. The distribution status information 100s (the distribution status information $100C_X$, $100C_Y$, and $100C_Z$) and the distribution status information 101s (the distribution status information $101_{N1}$ and $101_{N2}$) generated on the basis of the distribution completion notifications Srp1, Srp2, and Srp4 are stored as a database in the first storage area 32A and the second storage area 32B, respectively.

The controller 31 controls the whole distribution management server SV by making the CPU included in the controller 31 execute a program stored in the storage 32 or the like. When a new distribution completion notification Srp1, Srp2, or Srp4 is transmitted, the distribution status information 100s and 101s are updated in accordance with the notification, and the updated information is stored.

The processes in the first example in the node N having the above-described configuration will now be concretely described with reference to FIG. 7.

As shown in FIG. 7, in the case where the controller 11 in each of the nodes Ns participating in the content distribution system $S_1$ of the first example becomes the loading destination of the content C or the generation place of the replica R, when reception of the content data CD corresponding to the content C starts, while receiving the content data CD (step S1), the controller 11 monitors whether all of necessary data as the content data CD is received or not (step S2).

When all of the necessary data has not been received (NO in step S2), the controller 11 returns to the step S1 and continues receiving the necessary content data CD. On the other hand, when reception of all of the content data CD is completed (YES in step S2), the controller 11 immediately generates the distribution completion notification Srp and sends it to the distribution management server SV (step S3), thereby completing the process of receiving the content data CD of the node N.

The distribution completion notification Srp transmitted in the step S3 includes at least so-called node ID for identifying the node N itself from the other nodes N in the content distribution system S1, a content ID for identifying the content C corresponding to content data CD received by the node N, and date and time information indicative of the date and time of completion of reception of the whole content data CD.

The controller 31 in the distribution management server SV which has received the distribution completion notification Srp including the above-described information updates the distribution status information 100s and 101s on the basis of the received distribution completion notification Srp and stores the updated information in the storage 32 (refer to FIG. 1B).

Second Example

The concrete configurations and processes of the content loading server MN, each of the nodes Ns, and the distribution management server SV belonging to the content distribution system $S_2$ of the second embodiment will be described as a second example with reference to FIG. 8 and FIGS. 9A and 9B.

Figure 8:
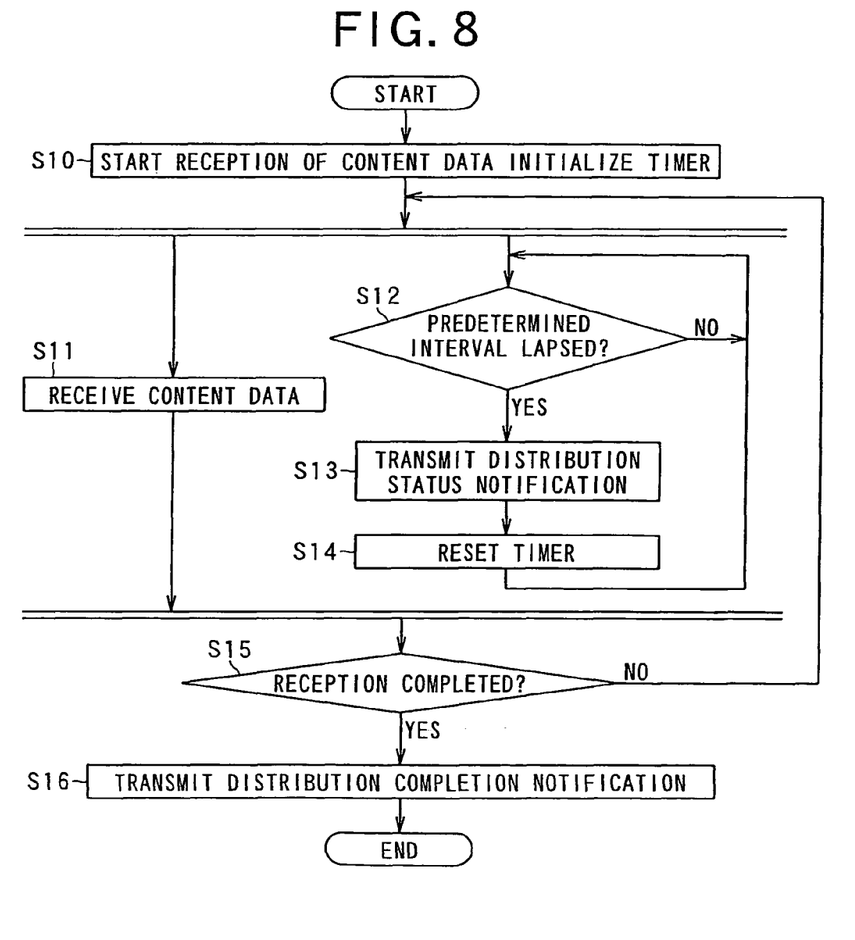
FIG. 8 is a flowchart showing processes performed in each of nodes in example 1 in a second example.
Figure 9A:
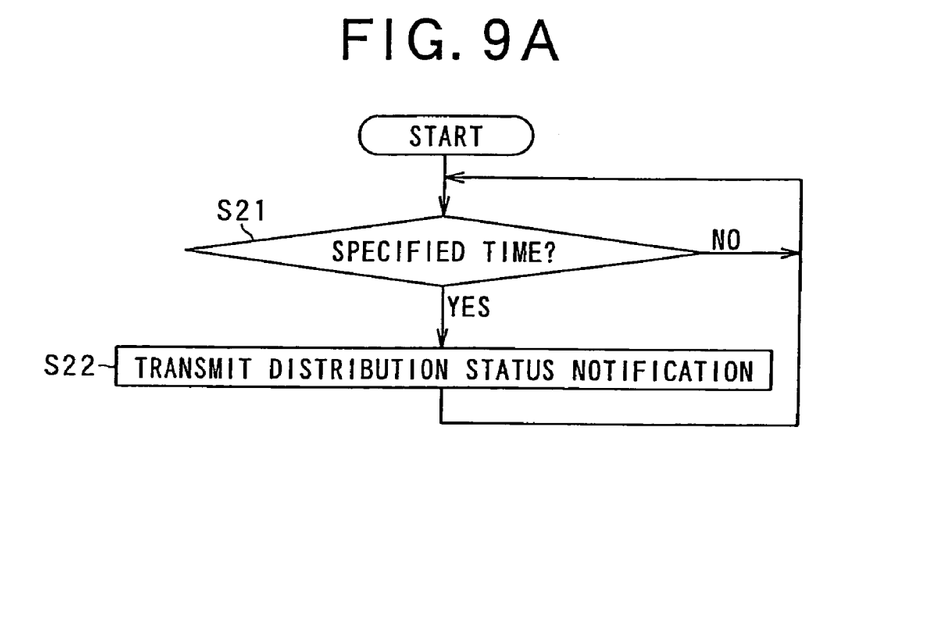
FIG. 9A is a flowchart showing processes performed in each of nodes in an example 2 in the second example.

FIGS. 8 and 9A are flowcharts showing processes in the second example executed by the representative node N in the first example. Since the schematic configurations and schematic operations of the content loading server MN, each of the nodes Ns, and the distribution management server SV belonging to the content distribution system $S_2$ of the second example are similar to those of the content loading server MN, each of the nodes Ns, and the distribution management server SV of the first example, the detailed description will not be repeated.

(I) Example 1

Example 1 of the operation in each of the nodes N in the second example will be described with reference to FIG. 8. Example 1 relates to processes performed in the case where the distribution progress notification Sr indicative of progress of loading and generation in the process of loading the content C and the process of generating the replica R in the operations of each node N in the second embodiment are transmitted to the distribution management server SV via a network at preset constant intervals, and when the loading of the content C and the generation of the replica R is completed, the distribution completion notification Srp is generated and transmitted to the distribution management server SV.

Specifically, in the case where the controller 11 of each of the nodes N participating in the content distribution system $S_2$ of the second example becomes the loading destination of content C or the generation destination of a replica R, as the operation of Example 1, on start of reception of content data CD corresponding to the content C, the controller 11 starts counting of a not-shown timer in the controller 11 (step S10).

Concurrently with reception of the content data (step S11), the controller 11 always monitors whether the predetermined interval (for example, 10 minutes) has elapsed or not in the counting of the timer (step S12). When the predetermined interval has not elapsed (NO in step S12), the controller 11 continues the counting while continuing reception of the content data CD. On the other hand, when it is determined in the step S12 that the predetermined interval has elapsed (YES in step S12), the controller 11 immediately generates the distribution progress notification Sr with reference to the amount of data stored in the buffer memory 23 (the received data amount) and transmits it to the distribution management server SV via a network (step S13). The controller 11 resets the timer (step S14), starts new counting, and returns to the step S12.

After that, the controller 11 continues receiving the content data CD while repeating the generation and transmission of the distribution progress notification Sr in the predetermined intervals, and further, the controller 11 monitors reception of all of the content data CD is completed or not (step S15).

When the reception of all of the content data CD has not been completed (NO in step S15), the controller 11 returns to the steps S11 and S12 and repeats the above-described processes. On the other hand, when the reception of all of the content data CD is completed (YES in step S15), the controller 11 immediately generates the distribution completion notification Srp and transmits it to the distribution management server SV (step S16), thereby finishing the process of receiving the content data CD of the node N.

The distribution progress notification Sr transmitted in the step S13 includes at least the node ID, the content ID, the data amount of the content data CD which has been received at that time point, and date and time information indicative of the date and time corresponding to the data amount. In a manner similar to the case of the first example, the distribution completion notification Srp transmitted in the step S16 includes the content ID and the date and time information.

The controller 31 in the distribution management server SV which has received the distribution progress notification Sr and the distribution completion notification Srp including the above-described information updates the distribution status information 200s and 201s on the basis of content of the received distribution progress notification Sr and distribution completion notification Srp and stores the updated information in the storage 32 (refer to FIG. 2B).

(II) Example 2

Example 2 of the operation in each of the nodes Ns in the second example will be described with reference to FIGS. 9A and 9B. Example 2 relates to transmission of the distribution progress notification Sr indicative of progress of loading and generation in the process of loading the content C and the process of generating the replica R in the operations of each of the nodes Ns in the second embodiment to the distribution management server SV via a network at preset constant intervals.

Specifically, as shown in FIG. 9A, the controller 11 of each of the nodes Ns participating in the content distribution system $S_2$ of the second example always monitors whether it becomes the specified time or not in the counting of a not shown timer (step S21). When it is not the specified time (NO in step S21), the controller 11 continues the counting. On the other hand, when it is determined in the step S21 that it is the specified time (YES in step S21), the controller 11 immediately generates the distribution progress notification Sr with reference to the amount of data stored in the buffer memory 23, transmits it to the distribution management server SV via a network (step S22), and returns to the step S21. The processes shown in FIG. 9A are basically repeated until the power switch in the node N is turned off.

The distribution progress notification Sr transmitted in the step S22 includes, like the distribution progress notification Sr transmitted in the step S13 in FIG. 8, at least the node ID, the corresponding content ID, the reception data amount, and date and time information indicative of the date and time corresponding to the data amount.

The controller 31 in the distribution management server SV which has received the distribution progress notification Sr and the distribution completion notification Srp including the above-described information updates the distribution status information 200s and 201s on the basis of the received distribution progress notification Sr and distribution completion notification Srp and stores the updated information in the storage 32 (refer to FIG. 2B).

Figure 9B:
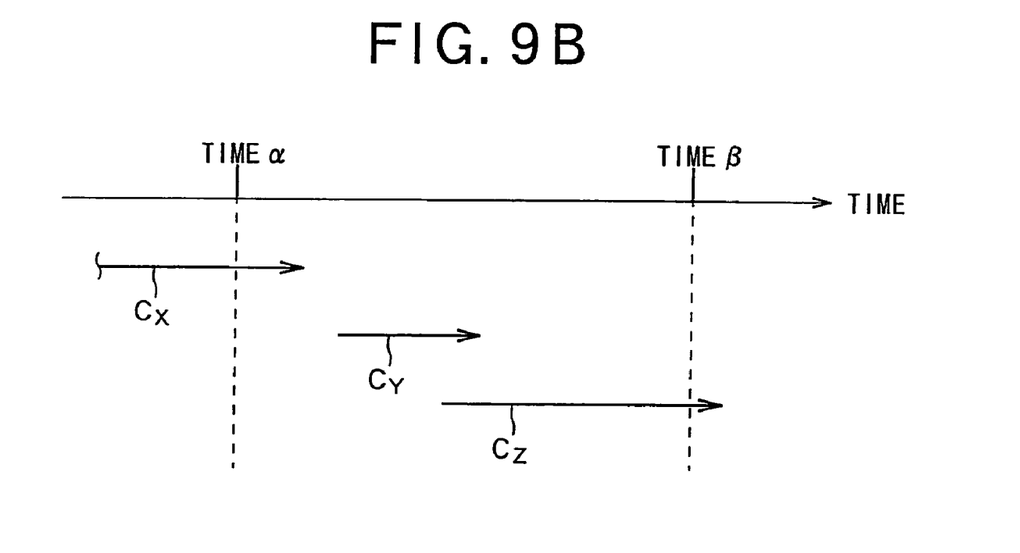
FIG. 9B is a diagram showing processes performed in a distribution management server in the example 2.

In the case of receiving content data CD corresponding to a plurality of content Cs in one node N in Example 2, as shown in FIG. 9B, for example, a status that content data CD corresponding to content $C_X$ is being received at time α (for example, 70% has been received) is stored as the distribution status information 200s or 201s in the storage 32. After that, for example, a status that content data CD corresponding to content $C_Z$ is being received at time β (for example, 90% has been received) is stored as the distribution status information 200s or 201s into the storage 32. A status that the content data CD corresponding to the content $C_X$ and $C_Y$ has been received is stored as the distribution status information 200s or 201s together with the reception completion date and time into the storage 32.

Third Example

The concrete configurations and processes of the content loading server MN, each of the nodes Ns, the distribution management server SV, and the menu server U belonging to the content distribution system $S_4$ of the fourth embodiment will be described as a third example with reference to FIGS. 6B and 10A.

Figure 6B:
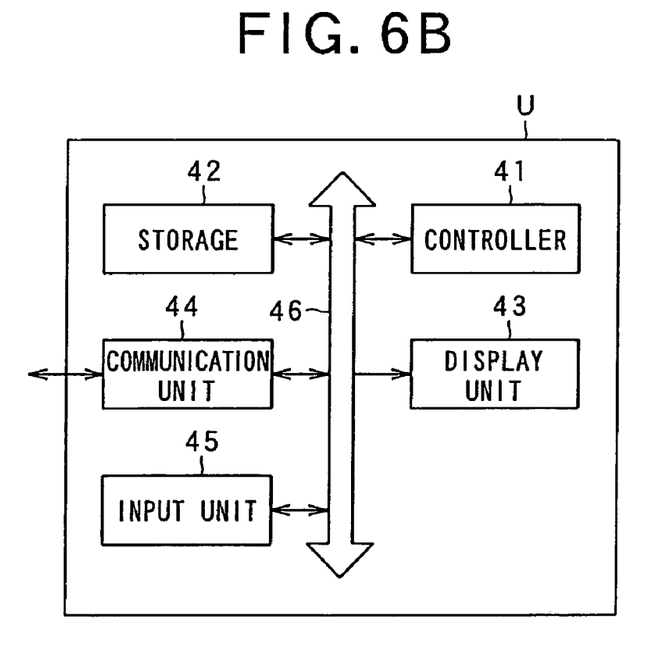
FIG. 6B is a block diagram showing a detailed configuration of a menu server in the fourth embodiment.
Figure 10A:
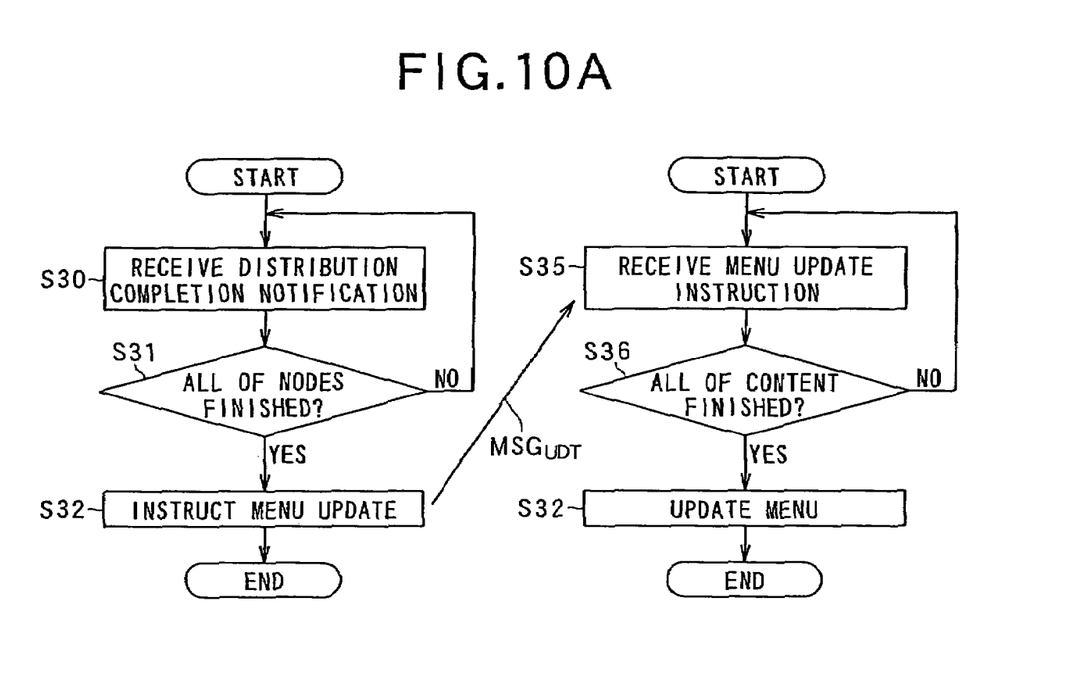
FIG. 10A is a flowchart showing operations of a distribution management server and a menu server in a third example.

FIG. 6B is a block diagram showing the detailed configuration of the menu server U of the third example and FIG. 10A is a flowchart showing processes executed in the distribution management server SV and the menu server U in the third example. Since the schematic configurations and schematic operations of the content loading server MN, each of the nodes Ns, and the distribution management server SV belonging to the content distribution system $S_4$ of the third example are basically similar to those of the content loading server MN, each of the nodes Ns, and the distribution management server SV of the first example, the detailed description will not be repeated.

First, schematic configuration and schematic operation of the menu server U of the third example will be described with reference to FIG. 6B.

As shown in FIG. 6B, the menu server U of the third example has: a controller 41c comprised of a CPU having computing function, a work RAM, a ROM for storing various data and programs (including an OS and various applications), and the like; a storage 42 made by an HDD or the like for storing various data and the like; a communication unit 44 for controlling communication of information with each of the nodes Ns and the like via the network; a display unit 43 such as a CRT or a liquid crystal display for performing necessary displaying as the menu server U under control of the controller 41; and an input unit (such as a mouse, a keyboard, an operation panel, a remote controller, and the like) 45 for outputting instruction signals corresponding to various instructions from the user (content menu administrator) to the controller 41. The components are connected to each other via a bus 46.

In the configuration, the storage 42 stores, as a database, menu information corresponding to the content menu updated on the basis of the menu update message $MSG_{UDT}$ transmitted from the distribution management server SV.

The controller 41 controls the whole menu server U by making the CPU included in the controller 41 execute a program stored in the storage 42 or the like. When a new menu request message $MSG_{MENU}$ is transmitted from a node N, the controller 41 transmits the menu information to the node N as the transmitter of the menu request message $MSG_{MENU}$ so that the content menu can be displayed in the node N.

The operations of the third example in the distribution management server MN and the menu server U will now be concretely described with reference to FIG. 10A.

As shown in FIG. 10A, in the third example, first, the controller 31 of the distribution management server SV receives the distribution completion notification Srp from each of the nodes Ns (step S30) and determines whether the distribution completion notifications Srp are received from all of necessary nodes Ns (step S31). When reception of the distribution completion notifications Srp from all of the nodes Ns is not completed (NO in step S31), the controller 31 returns the process in the step S30 and continues the reception of the distribution completion notification Srp. On the other hand, when reception of the distribution completion notifications Srp from all of the nodes Ns is completed (YES in step S31), the controller 31 generates the menu update message $MSG_{UDT}$ indicative of the content C which has been distributed on the basis of the distribution status information 100s and 101s (in the case of the first embodiment) or 200s and 201s (in the case of the second embodiment) and transmits it to the menu server U via a network (step S32).

On the other hand, the controller 41 of the menu server U of the third example always monitors whether the menu update message $MSG_{UDT}$ has been transmitted or not. When the menu update message $MSG_{UDT}$ is received (step S36), the controller 41 determines whether the menu update messages $MSG_{UDT}$ corresponding to all of the content Cs storing menu information corresponding to the content menu could have been received or not (step S36).

When there is the content C of which menu update message $MSG_{UDT}$ has not been received (NO in step S36), the controller 41 returns to the step S35 and continues reception of the menu update message $MSG_{UDT}$. On the other hand, when it is determined in step S36 that reception of the menu update messages $MSG_{UDT}$ on all of the content Cs is completed (YES in step S36), the controller 41 updates the content menu in the menu server U on the basis of the received menu update messages $MSG_{UDT}$ (step S32), and finishes the processes of the menu server U.

By the processes of the third example, by transmitting the menu request message $MSG_{MENU}$ to the menu server U, each of the nodes Ns participating in the content distribution system $S_4$ can display the latest content menu updated on the basis of the menu update message $MSG_{UDT}$ in each of the nodes N.

Fourth Example

Processes in the content loading server MN common to the foregoing embodiments will be described as the fourth example with reference to FIG. 10B.

In the foregoing first to third embodiments, the controller 11 of the content loading server MN transmits the content data CD corresponding to content C to the node $N_1$ as the content node and loads the content C into the node $N_1$. In this case, the controller 11 monitors the distribution status in the loading process (step S40) and checks to see whether a delay occurs in the distribution or not (step S41). The processes in the steps S40 and S41 will be described more concretely. For example, in the case of the first embodiment, the controller 11 determines that a delay in distribution occurs (YES in step S41) in the case where the distribution completion notification Srp is not received from the node $N_1$ after lapse of preset standby time, in the case where the distribution completion notification Srp is not transmitted from only one of a plurality of nodes Ns to which the content C is simultaneously loaded, or the like (YES in step S41). When it is determined in the step S41 that no delay occurs or when the standby time has not lapsed (NO in step S41), the controller 11 returns to the step S40 and continues monitoring the distribution status.

When it is determined that a distribution delay occurs (YES in step S41), the controller 11 executes a process to increase the distribution speed in the node $N_1$ in which the delay occurs (step S42) and finishes the processes of the content loading server MN of the fourth example.

Concrete examples of the process in the step S42 are as follows. When a distribution time zone is regulated by, for example, performing no distribution in a time zone in which content data CD transmissions concentrate, a cancellation message for temporarily canceling the time zone regulation is transmitted. Alternatively, when the bandwidth of a network used for the distribution is regulated, a cancellation message for temporarily canceling the bandwidth limit is transmitted.

As described above, in the operations of the content distribution system $S_1$ of the first embodiment and the first example, the distribution completion notification Srp or the distribution progress notification Sr indicative of the distribution status in a node N to which content data CD is distributed is output from the node N. The notification output is received and stored in the distribution management server SV on the node N unit basis. Thus, the distribution status to each of the nodes Ns of the content data CD can be reliably managed by the distribution management server SV without overloading the distribution management server SV.

Since the distribution completion notification Srp indicative of completion of reception of the content data CD is output from each of the nodes Ns to which the content data CD is to be distributed, whether the distribution is completed or not can be managed on the node N unit basis in the distribution management server SV.

Further, in the operations of the content distribution system $S_2$ of the second embodiment and the second example, the distribution completion notification Srp or the distribution progress notification Sr indicative of the distribution status in a node N to which content data CD is distributed is output from the node N. The output notification is received and stored in the distribution management server SV on the node N unit basis. Thus, the distribution status (such as the distributed data amount) to each of the nodes Ns of the content data CD can be reliably managed by the distribution management server SV without overloading the distribution management server SV.

In the example 1 of the second example in which the distribution progress notification Sr is received at predetermined intervals, the distribution management server SV can manage the received data amount of each predetermined interval on the node N unit basis.

In the example 2 of the second example in which the distribution progress notification Sr is received every specified time, the distribution management server SV can manage the received data amount of each specified time on the node N unit basis.

Further, in the operations of the content distribution system $S_3$ of the third embodiment, the distribution completion notification Srp or the distribution progress notification Sr is transferred to the distribution management server SV via a root node that controls distribution of content data CD to each of the nodes Ns. Consequently, the distribution status of the content data CD to each of the nodes Ns can be managed by the distribution management server SV without overloading the distribution management server SV.

In the operations of the content distribution system $S_4$ of the fourth embodiment, the content menu showing the content data CD which can be distributed is updated on the basis of the distribution completion notification Srp or the distribution progress notification Sr received by the distribution management server SV. Thus, the content menu can be promptly updated on completion of distribution of the content data CD, and each of the nodes Ns can promptly grasp the content C which can be actually output.

Further, in the operation of the content loading server MN of the fourth example, the node N in which delay of the content data CD occurs is detected on the basis of the distribution completion notification Srp or the distribution progress notification Sr, and a cancellation message or the like for promoting distribution is transmitted to the detected node N. Thus, completion of distribution in all of the nodes Ns to which content data CD is to be distributed can be promoted.

Furthermore in the case where the cause of the distribution delay is regulation of the distribution time zone, a cancellation message for canceling the regulation is transmitted. In the case where the cause of the distribution delay is regulation of distribution speed, a cancellation message for canceling the regulation is transmitted, therefore, in both cases, the distribution delay is promptly cancelled, and distribution of the content data CD can be completed.

In the embodiments and examples, the invention is applied to the time of loading the content C and the time of generating the replica R. The invention can be also applied to the case such that, at the time of normal distribution of content C in the content distribution system S (that is, normal distribution other than the loading of content C and generation of replicas R), by transmitting the distribution completion notification Srp or the distribution progress notification Sr from a request node that requests for distribution, the root node or the like that controls the distribution grasps the distribution state.

Further, by recording a program corresponding to each of the flowcharts shown in FIGS. 7, 8, and 9A on an information recording medium such as a flexible disk or a hard disk, or obtaining the program via the Internet or the like and saving it, then reading and executing the program by a general computer, the computer can be utilized as the controller 21 in the node N of each of the embodiments.

Figure 10B:
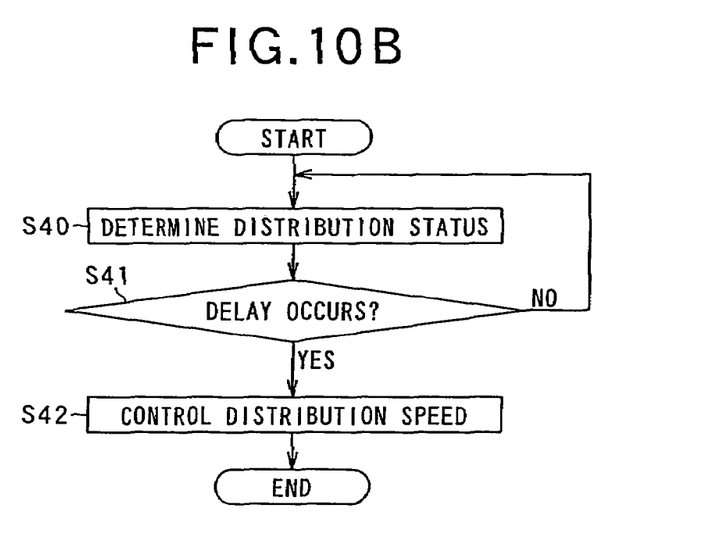
FIG. 10B is a flowchart showing operations of a content loading server in a fourth example.

By recording a program corresponding to each of the flowcharts of FIGS. 10A and 10B on an information recording medium such as a flexible disk or a hard disk, or obtaining the program via the Internet or the like and saving it, then reading and executing the program by a general computer, with respect to the program corresponding to the flowchart of FIG. 10A, the computer can be utilized as the controller 31 in the distribution management server SV or the controller 41 in the menu server U. With respect to the program corresponding to the flowchart of FIG. 10B, the computer can be utilized as the controller 11 in the content loading server MN.

As described above, the present invention can be utilized in the fields of distribution of content using a so-called P2P type content distribution system. In particular, when the invention is applied to the fields of distribution of content whose distribution completion time has to be grasped such as a movie and music, remarkable effects can be obtained.

The present invention is not confined to the configuration listed in the foregoing embodiments, but it is easily understood that the person skilled in the art can modify such configurations into various other modes, within the scope of the present invention described in the claims.

What is claimed is:

1. An information distribution system including a plurality of information processors which transmit and receive distribution information via a network, and a management apparatus for managing a distribution status of the distribution information, the information distribution system being an information distribution system of a peer-to-peer type constituted by the plurality of information processors,
   wherein at least one information processor of the plurality of information processors comprises:
      a first receiving unit which receives the distribution information from any of the plurality of information processors in the information distribution system of the peer-to-peer;
      a determining unit configured to determine reception status information based on an amount of the distribution information received from any of the plurality of information processors in the information distribution system of the peer-to-peer; and
      a transmitting unit which transmits reception status information indicative of a reception status of the corresponding amount of the distribution information to the management apparatus;
   the management apparatus comprises:
      a second receiving unit which receives the reception status information transmitted by the transmitting unit of the information processors in the information distribution system of the peer-to-peer;
      a management unit which manages a distribution status of the distribution information for the information processors which receive the distribution information, using the reception status information received by the second receiving unit,
      a delay device determining unit configured to determine the information processor in which a delay in distributing the distribution information occurs on the basis of the reception status information obtained;
      a distribution promoting unit configured to, in response to determining the information processor in which the distribution delay occurs, transmit distribution promotion information indicating that the distribution is to be promoted for the information processor in which the distribution delay occurs; and
      a cause determining unit configured to determine a cause of the distribution delay; and
   when the cause determination unit determines that the distribution delay is caused by limitation of a distribution time zone, the distribution promoting unit transmits the distribution promotion information that promotes cancellation of the limitation to the information processor in which the distribution delay occurs.

2. The information distribution system according to claim 1,
   wherein the determining unit determines whether all of the distribution information to be distributed has been received by the information processor comprising the determining unit, and
   the transmitting unit transmits the reception status information indicating that all of the distribution information has been received, to the management apparatus,
   the management apparatus manages whether all of the distribution information has been received, for each information processor.

3. The information distribution system according to claim 1,
   wherein the determining unit determines an amount of the distribution information received by the information processor comprising the determining unit, out of the distribution information to be distributed, and
   the transmitting unit transmits the reception status information indicative of the determined received information amount.

4. The information distribution system according to claim 3,
   wherein the determining unit determines the received information amount at every lapse of predetermined time period, and
   the transmitting unit transmits the reception status information indicative of the received information amount determined at every lapse of the predetermined time period.

5. The information distribution system according to claim 1, wherein the determining unit determines the received information amount of one or plural pieces of the distribution information at every predetermined time, and the transmitting unit transmits the reception status information indicative of the received information amount determined at every predetermined time.

6. The information distribution system according to claim 1, further comprising a controller for controlling distribution of the distribution information to each of the information processors, wherein the controller comprises:

a reception status information storing unit which temporarily stores the reception status information transmitted from each of the information processors; and a reception status information transmitting unit which transmits the temporarily stored reception status information to the management apparatus.

7. The information distribution system according to claim 1, further comprising a menu management apparatus comprising a menu storing unit which stores menu information corresponding to a transmittable distribution information menu indicating that the distribution information can be transmitted in the information processor as a distribution destination of the distribution information so that the transmittable distribution information menu can be viewed from the information processor via the network, wherein the management apparatus comprises:

a distribution completion determining unit configured to determine whether reception of the whole distribution information has been completed in all of the information processors to which the distribution information is to be distributed on the basis of the reception status information; and a completion information transmitting unit configured to, in response to determining completion of reception of the whole distribution information in all of the information processors, transmit distribution completion information indicative of completion of the distribution, and distribution completion identification information indicative of the distribution information which has been distributed, to the menu management apparatus, and the menu management apparatus updates the menu information on the basis of the distribution completion identification information received.

8. The information distribution system according to claim 1, wherein when the distribution delay is caused by limitation of distribution speed and the limitation of the distribution time zone, the distribution promoting unit transmits the distribution promotion information that promotes cancellation of the limitations to the information processor in which the distribution delay occurs.

9. The information distribution system according to claim 1, wherein the transmitting unit transmits reception status information and identification information of the distribution information received by the first receiving unit, the second receiving unit receives the reception status information and the identification information, and the storing unit stores the reception status information and the identification information received by the second receiving unit corresponding to each other.

10. A non-transitory computer-readable storage medium that stores a computer-executable program for an information distribution system including a plurality of information processors which transmit and receive distribution information via a network, and a management apparatus for managing a distribution status of the distribution information, the information distribution system being an information distribution system of a peer-to-peer type constituted by the plurality of information processors, the program comprising instructions for:

receiving, by an information processor of the plurality of the information processors, the distribution information from any of the plurality of information processors in the information distribution system of the peer-to-peer;

determining, by the information processor, the reception status information based on an amount of the distribution information received from any of the plurality of information processors in the information distribution system of the peer-to-peer;

transmitting, by the information processor, reception status information indicative of a reception status of the corresponding amount of the distribution information to the management apparatus;

receiving, by the management apparatus, the reception status information transmitted by the information processors;

managing, by the management apparatus, a distribution status of the distribution information for the information processors which receive the distribution information, using the reception status information obtained;

determining, by the management apparatus, the information processor in which a delay in distributing the distribution information occurs on the basis of the reception status information obtained;

transmitting, by the management apparatus, distribution promotion information indicating that the distribution is to be promoted for the information processor in which the distribution delay occurs, in response to determining the information processor in which the distribution delay occurs;

determining, by the management apparatus, a cause of the distribution delay; and when the distribution delay is caused by limitation of a distribution time zone, transmitting, by the management apparatus, the distribution promotion information that promotes cancellation of the limitation to the information processor in which the distribution delay occurs.

11. An information distribution method in an information distribution system including a plurality of information processors which transmit and receive distribution information via a network, and a management apparatus for managing a distribution status of the distribution information, the information distribution system being an information distribution system of a peer-to-peer type constituted by the plurality of information processors, the method comprising steps of:

receiving, by an information processor of the plurality of the information processors, the distribution information from any of the plurality of information processors in the information distribution system of the peer-to-peer;

determining, by the information processor, reception status information based on an amount of the distribution information received from any of the plurality of information processors in the information distribution system of the peer-to-peer; and transmitting, by the information processor, reception status information indicative of a reception status of the corresponding amount of the distribution information to the management apparatus, receiving, by the management apparatus, the reception status information transmitted by the information processors;

managing, by the management apparatus, a distribution status of the distribution information for the information processors which receive the distribution information, using the reception status information obtained;

determining, by the management apparatus, the information processor in which a delay in distributing the distribution information occurs on the basis of the reception status information obtained;

transmitting, by the management apparatus, distribution promotion information indicating that the distribution is to be promoted for the information processor in which the distribution delay occurs, in response to determining the information processor in which the distribution delay occurs;

determining, by the management apparatus, a cause of the distribution delay; and when the distribution delay is caused by limitation of a distribution time zone, transmitting, by the management apparatus, the distribution promotion information that promotes cancellation of the limitation to the information processor in which the distribution delay occurs.

* * * * *